(No Model.)
G. T. WARWICK.
PROCESS OF FORMING BACK BONES AND REAR FORKS OF BICYCLES FROM A SINGLE BLANK.
No. 397,405. Patented Feb. 5, 1889.
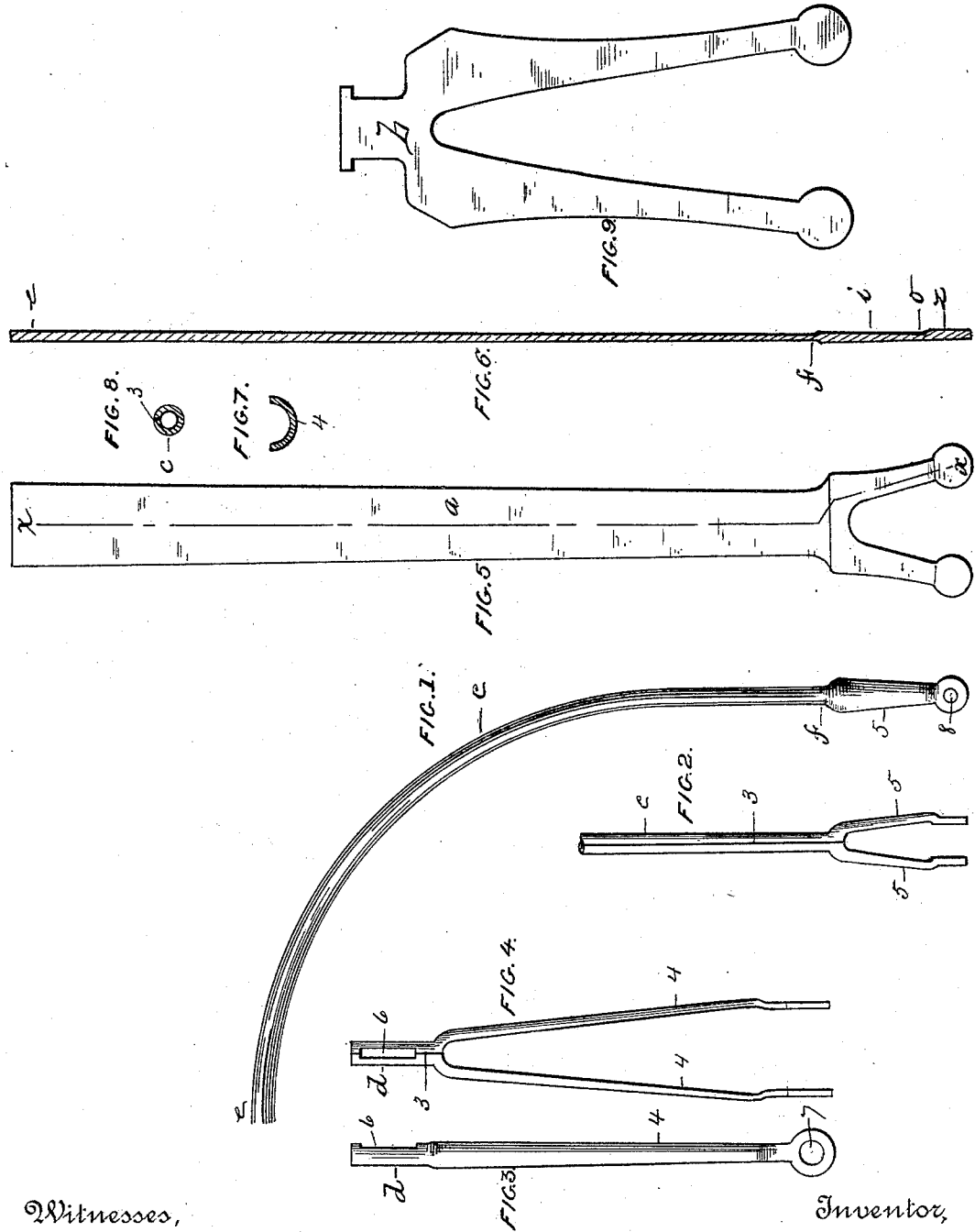
Witnesses,
Wm. F. Bellows
G. M. Chamberlain.
Inventor,
Geo. T. Warwick,
By his Attorneys Chapin &c.

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

PROCESS OF FORMING BACKBONES AND REAR FORKS OF BICYCLES FROM A SINGLE BLANK.

SPECIFICATION forming part of Letters Patent No. 397,405, dated February 5, 1889.

Application filed March 23, 1888. Serial No. 268,297. (No model.)

*To all whom it may concern:*

Be it known that I, GEORGE T. WARWICK, a citizen of Great Britain, residing at Springfield, county of Hampden, and State of Massachusetts, have invented certain new and useful Improvements in the Art or Process of Making integrally from Sheet Metal, for Bicycles and similar Vehicles, Backbones and their Rear-Wheel Forks and Front-Wheel Forks and the Hollow Heads Thereof; and I do hereby declare that the following is a full, clear, and exact description of the invention, which will enable others skilled in the art to which it appertains to make and use the same.

Heretofore the above-referred-to backbone and front-wheel fork for bicycles have been made, respectively, by forming said backbone from a metallic tube, and subsequently attaching a separately-made rear-wheel fork by brazing or other suitable method, and the front-wheel forks of the machine and the head for said forks have been made in separate parts and secured together in substantially the manner above referred to relative to the rear-wheel fork and the backbone.

The object of my invention is to simplify the construction of said parts by reducing the number of pieces required to be made and united to form each one of the above-mentioned bicycle parts, and thus greatly reduce the cost of manufacturing the same.

In the drawings forming part of this specification, Figure 1 is a side elevation of the backbone and rear-wheel fork of a bicycle constructed by the employment of my improved process. Fig. 2 is a view of the side of the backbone and rear-wheel fork, which, when the backbone is embodied in a machine, is opposite the periphery of the front wheel thereof, this figure showing only that portion of the backbone immediately adjoining the rear-wheel fork, and showing also the seam or joint line of the backbone. Fig. 3 is a side elevation of the front-wheel fork and the head thereof; and Fig. 4 is a similar view to Fig. 3, but showing said front-wheel fork and its head as it appears looking at the machine from its rear wheel forward. Fig. 5 is a plan view of a sheet-metal blank from which the backbone and fork, Figs. 1 and 2, are constructed. Fig. 6 is a longitudinal section on the line *x x*, Fig. 5. Fig. 7 is a transverse section of one of the fork-legs. Fig. 8 is a transverse section through the backbone at some point between the rear-wheel fork and the upper end thereof. Fig. 9 is a plan view of a sheet-metal blank from which the front-wheel fork, Figs. 3 and 4, and the head thereof is formed.

In carrying my invention into effect for the manufacture of either the backbone and the rear-wheel fork or the front fork and the head thereof I first cut from a sheet of metal, preferably of steel, a blank, substantially as illustrated in Figs. 5 or 9, of suitable size and form for the construction of said parts. I refer to the said two parts of a bicycle in conjunction because identically the same process of manufacture is applicable to each one of them, for the front-wheel fork and its head, made of a single piece of metal, represents, substantially, a portion of the backbone adjoining the rear-wheel fork thereof, but somewhat larger in diameter and having the fork parts longer and larger than those of the rear wheel.

In further carrying my invention into effect I impart to said backbone and fork-head a cylindrical tubular form by bending the said blank parts, Figs. 5 and 9, which are indicated by the letters *a* and *b*, thereby forming the tubular backbone *c* and the tubular front-wheel fork-head *d*, said tubular parts being formed on a suitable mandrel or former, whereby the opposite edges of said tubular parts are brought into juxtaposition, thus forming a longitudinal seam, 3, (shown on the backbone part in Fig. 2 and on the fork-head *d*, Fig. 4,) and I then rigidly attach said adjoining edges by brazing, soldering, or other suitable means, and finally finish said parts by giving them the required form, that of the backbone being illustrated in Fig. 1, and the form of the fork-legs 4 of the front-wheel fork and 5 of the rear-wheel fork being half-round or curved in cross-section, as illustrated in Fig. 7, whereby said fork-legs are given the requisite rigidity and strength. The said adjoining edges of the blanks *a* and *b*, forming the seam 3 of said parts, may be either butted, lapped, or otherwise suitably jointed, and then secured as aforesaid.

In Figs. 3 and 4 an opening, 6, of rectangular form, in the rear side of the head $d$ of the front-wheel fork, is indicated, which serves the usual purpose of providing for the insertion of the backbone-spindle into said fork-head, that portion of the ordinary backbone-head between said spindle and the backbone passing through said opening 6 in the usual manner. The usual perforations, 7 and 8, respectively, are made in the lower ends of the fork-legs 4 and 5 to receive the axles of the front and rear wheels of the machine. The said sheet-metal blank $a$, from which the backbone and the rear-wheel fork are made, is made preferably of such varying thickness as is illustrated in Fig. 6, in order that the backbone and fork parts thereof shall possess the greatest strength where the strain thereon is excessive. To that end I prefer to construct the backbone of a diminishing thickness from its upper end, $e$, to its junction at $f$ with the rear-wheel fork, and then increase the thickness of that part of the blank at $i$, which forms the legs of the fork, tapering said leg parts slightly, as shown, to a point near the lower extremities thereof, at $o$, and then increasing the thickness of the latter at $z$ to provide a better bearing for the axle of the wheel; and so far as the parts of the blank $b$ are concerned, which enter into the construction of the front fork-legs, 4, they are given substantially such varying thicknesses as are above described relative to the fork parts on the lower end of the backbone.

Having fully described my invention, what I desire and claim to secure by Letters Patent is—

The within-described process for making the backbone and the rear-wheel fork of a bicycle from a single piece of sheet metal, which consists in cutting a blank of proper form from said sheet metal, having a part to form said backbone and parts to form the two legs of said fork, and then imparting a cylindrical tubular form to said backbone part and rigidly uniting the meeting edges thereof, and imparting a curved form in cross-section to said fork parts, and finally perforating the fork-legs to receive an axle and shaping and finishing the sheet-metal piece so made, substantially as set forth.

GEO. T. WARWICK.

Witnesses:
H. A. CHAPIN,
G. M. CHAMBERLAIN.